Oct. 2, 1956     H. W. SULLIVAN     2,765,105
FAT SAVER VESSEL FOR GRAVY AND THE LIKE
Filed Feb. 28, 1955

HAROLD W. SULLIVAN,
INVENTOR.

BY Eaton + Bell

ATTORNEYS

2,765,105

FAT SAVER VESSEL FOR GRAVY AND THE LIKE

Harold W. Sullivan, Anderson, S. C.

Application February 28, 1955, Serial No. 491,043

2 Claims. (Cl. 222—510)

This invention relates to a fat saver vessel and has for its object the provision of a simple economically made sanitary container or utensil for use in effecting a quick and efficient separation of fat and grease from a liquid of high specific gravity such as water or gravy.

Another object of the invention is to provide a vessel which can be placed on the eating table with simple means on the vessel for controlling the flow of gravy or the like therefrom.

Some of the objects of the invention having been stated, other objects will appear as the description proceeds when taken in connection with the accompanying drawings, in which—

Figures 1, 2:
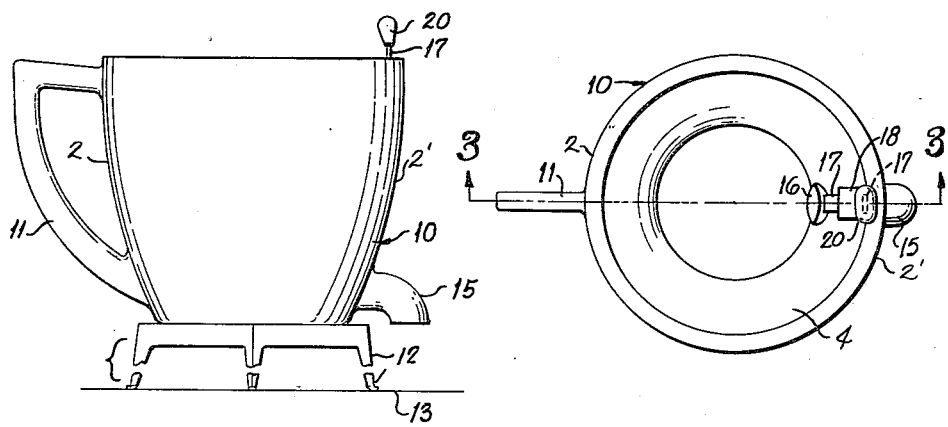
Figure 1 is an elevational view of the vessel placed on a stand.
Figure 2 is a top plan view.

The great difficulty of efficiently separating fat, grease and the like from water, as is desirable in the cooking art in particular, is well known to those skilled in the art. In the making of soup stock and gravy where meat is used, the ordinary practice is to skim off the fat or grease. Sometimes, the stock is allowed to cool until the fat congeals and the fat is then removed from the stock. The skimming method is notoriously inefficient, since much of the water is removed with the grease, and the cooling method is wholly impractical due to the time required. Costly centrifuges are out of the question in ordinary households.

With my invention, a specially constructed and, preferably transparent pitcher or vessel is provided into which the operator merely pours the liquid containing the fat. Immediately, the fat rises to the top of the liquid with which it has been mixed, such as the water in soup stock or gravy stock. Simple, safe and efficient means are provided for returning the stock, free from fat, back into the original utensil or into any other receptacle while leaving all the fat in the vessel for subsequent pouring into another receptacle.

Referring more specifically to the drawings, the numeral 10 indicates a fat saving vessel or pitcher of refractory material which is preferably transparent. The pitcher 10 has an annular wall including lateral side wall portions 2, 2'. The pitcher also has a bottom wall 3, and an open top 4. The vessel 10 is preferably provided with a handle 11 and is adapted to be placed on a stand 12 which can be placed on a surface such as a stove or table 13. The vessel 10 is adapted to be filled with gravy, soup or the like. The vessel is provided with a spout 15 extending outwardly and downwardly from the lateral wall 2' and is normally closed by a hemispherically-shaped plug or valve 16, preferably made of refractory or heat resistant material. The spout 15 defines an opening 14 in the side wall 2'. A leaf spring member 17 is slidably mounted in an opening provided by rib 18 whose lower end terminates at a point above the spout 15. The upper end of the leaf spring member 17 is preferably provided with a handle 20 which may be seized by the operator to raise the spring 17 from the position shown in Figure 3 to the position shown in Figure 4 or vice versa for controlling the egress of the desirable contents in the vessel, such as gravy.

Figures 3, 4:
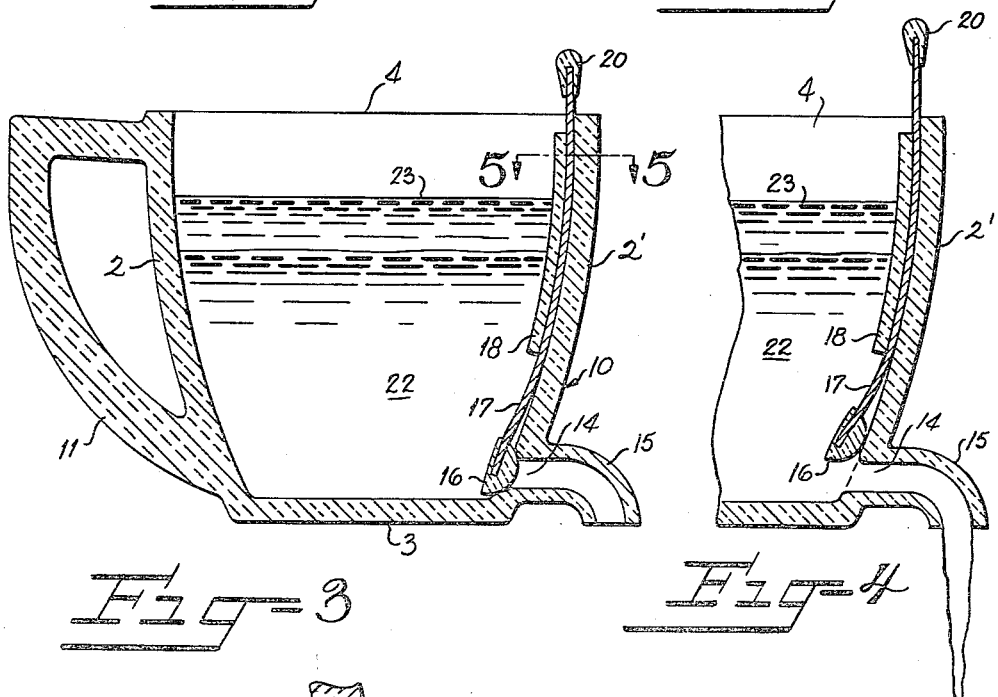
Figure 3 is an enlarged vertical sectional view taken along the line 3—3 in Figure 2, showing the valve in closed position and showing the vessel partially filled with a liquid supporting a mass of grease thereon.
Figure 4 is a fragmentary view similar to Figure 3, but showing the valve in open position.
Figure 5:
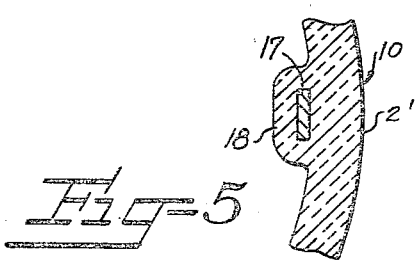
Figure 5 is an enlarged fragmentary cross-sectional view taken along the line 5—5 in Figure 3.

The valve 16 when moved from the open position of Figure 4 to the closed position of Figure 3 will be held in sealing engagement with the spout 15 by the pressure or force exerted by the leaf spring member 17. As will be observed in Figure 3, the valve 16 only partially enters the spout 15 to seal the same, thus causing the leaf spring to be bowed inwardly under tension to insure the application of a sealing force or pressure being applied to the valve 16.

The stock such as gravy or any material containing grease is indicated at 22, while 23 indicates the layer formed by grease arising out of the stock. By raising the valve or plug 16 by the handle 20 as shown in Figure 4, the stock such as gravy, can be drained off through the spout 15 of the vessel 10 until all is removed, except the grease 23, which time the grease can be saved by moving the plug or valve 16 to the closed position shown in Figure 3. Thereafter, said grease may be poured into a suitable container.

It is thus seen that I have provided a simple and efficient fat saving vessel for controlling the egress of liquid therefrom to separate the gravy or the like from the grease.

In the drawings and specification there has been set forth a preferred embodiment of the invention and although specific terms are employed, they are used in a generic and descriptive sense only and not for purposes of limitation, the scope of the invention being defined in the claims.

I claim:

1. An open top vessel for use in separating fat from other material comprising lateral side walls, a bottom wall, one of said side walls having an opening in the lower portion thereof, a spout connected with said opening, an elongated rib with an opening therein formed on the inner surface of one of the side walls and terminating in spaced relation above said opening connected to the spout, an elongated spring-like member slidably mounted in the opening of said rib, and a valve secured to the lower end of said spring-like member and adapted when in lowered position to be moved into sealing position by the outward force exerted by said spring-like member to thereby close said opening connected with said spout.

2. In an open top cup-like container having a side wall and a bottom wall, a tubular spout projecting outwardly and downwardly from the lower portion of said side wall and communicating with the interior of the container, an elongated rib extending longitudinally of and within said side wall and having its lower end terminating in spaced relation above said spout, said rib having its medial portion spaced from said side wall to define an elongated opening therebetween, an elongated spring-like member guided for vertical movement in said elongated opening and a valve connected to the lower end of said member, said valve comprising a hemispherically-shaped plug-like member adapted to be moved into open and closed position relative to the inner end of the spout.

(References on following page)

References Cited in the file of this patent

UNITED STATES PATENTS

| | | |
|---|---|---|
| 507,479 | Bradnack | Oct. 24, 1893 |
| 534,688 | Green | Feb. 26, 1895 |
| 578,765 | O'Callahan | Mar. 16, 1897 |
| 579,895 | Powell | Mar. 30, 1897 |
| 599,412 | Wightman | Feb. 22, 1898 |
| 791,624 | Horton | June 6, 1905 |
| 821,700 | Burkins | May 29, 1906 |
| 868,882 | Neuberth | Oct. 22, 1907 |
| 889,738 | Weber | June 2, 1908 |
| 923,229 | Williams | June 1, 1909 |
| 1,996,856 | Crane | Apr. 9, 1935 |
| 2,583,335 | Jepson | Jan. 22, 1952 |

FOREIGN PATENTS

| | | |
|---|---|---|
| 649,063 | France | Aug. 21, 1928 |